Figure 1:
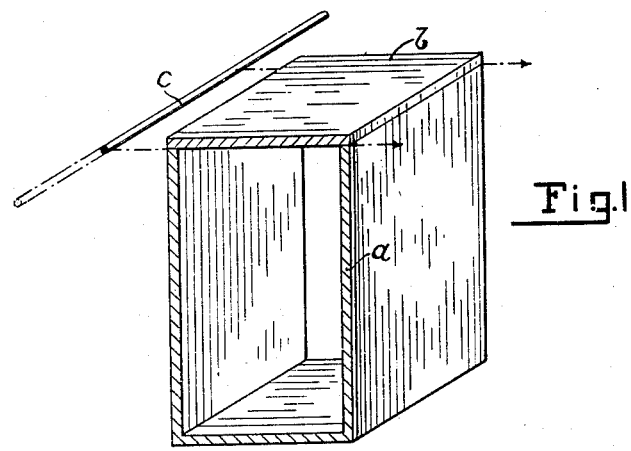

Dec. 14, 1954     H. H. QUANDT     2,697,162
METHOD OF SEALING BATTERIES
Filed May 12, 1953

INVENTOR.
HANS HUBERT QUANDT
BY   DEZSOE STEINHERZ
ATTORNEY

2,697,162

METHOD OF SEALING BATTERIES

Hans Hubert Quandt, Karlsruhe, Germany, assignor to Rudolf Mohr, Karlsruhe (Baden), Germany Application May 12, 1953, Serial No. 354,575

1 Claim. (Cl. 219—19)

This invention relates to electric batteries and has particular relation to batteries containing a liquid electrolyte, usually dilute sulfuric acid, in which the electrodes are immersed.

Safe operation of such batteries requires perfect sealing of the container or cell housing the sulfuric acid electrolyte. During manufacture of these electric cells or batteries great care has to be taken in order to avoid contamination of the electrodes and the electrolyte during assembling the cells. The containers for the electrolyte, which are usually made of celluloid, have, for example, the shape of a rectangular parallelepiped, which is open on one side, through which the electrolyte and the electrodes are introduced. This opening is closed when the parts are assembled, by cementing a cover plate on the cell or container for the electrolyte.

It has been previously suggested to use in batteries of the above mentioned type electrolyte containers consisting of polymeric organic, thermoplastic materials other than Celluloid and to effect sealing of such containers by cementing a cover plate or cover piece to, or into, the container. However, experience has shown that it is impossible or difficult to obtain satisfactory sealing in this manner even by proceeding with great care. Moreover, the use of adhesives for cementing, invariably resulted in the entrance of impurities into the interior of the cells and harmful effects caused by such impurities.

It has been known to weld together pieces of thermoplastic materials by heating the surfaces to be joined to a temperature, at which these plastic materials melt and fuse together. The use of such thermoplastic materials and their sealing by welding in the manufacture of electric cells, would, of course, eliminate contamination of the interior of the cells by solvents or adhesives. However, sealing by welding carried out by heating in conventional manner the surfaces to be joined, cannot be applied to electric cells of the above described type, because the heat applied cannot be confined to the surfaces to be welded. The heat applied spreads to material in the vicinity of the surfaces to be welded, it causes softening and distortion of such material and the formation of defective welding seams.

It has also been suggested to apply the heat necessary for welding to the interior of the objects to be welded. But in this procedure, the objects to be welded have to be placed for a short period of time in a high-frequency field, the necessary equipment is expensive, and thermoplastic materials which have the properties required in cells or containers for electrolytes, i. e. high strength, minimum porosity, thermal stability and lack of corrosion by the chemicals used, are not suitable for this procedure.

The main object of the present invention is to provide a process for quick and clean sealing of thermoplastic cells or containers of the above mentioned type, in simple efficient manner, without the use of expensive equipment.

According to one embodiment of the present invention, this is accomplished by placing or mounting a closing or cover piece on the open end of the cell or container, said closing piece and container consisting of weldable organic thermoplastic material, and passing an electrically heated metal wire between the adjoining parts of container and cover, in such manner that the adjoining surfaces are temporarily melted and subsequently welded to each other.

For example, a cover is placed on the open end of a container and an electrically heated wire is passed between and along the contacting surfaces of the edges and the cover. The heated wire causes the material, with which it comes in contact, to melt, and, after passing of the wire, the molten plastic material is fused together and forms a tight, integral seam.

The speed of movement of the wire is preferably adjusted in such manner that the heat supplied by the wire is preferably adjusted in such manner that the heat supplied by the wire is just sufficient for causing the surfaces to be welded, to melt. By proceeding in this manner, the effect of heat transmitted by the wire is limited to the spots to be welded, without affecting parts surrounding the desired welding seam. The thinner the heated wire is, the cleaner and less conspicuous the welding seam will be.

The appended drawings illustrate some embodiments of the invention, to which the invention is not limited.

Figure 2:
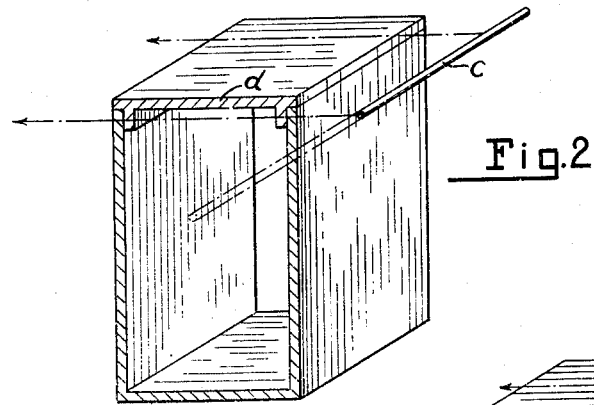
Figure 3:
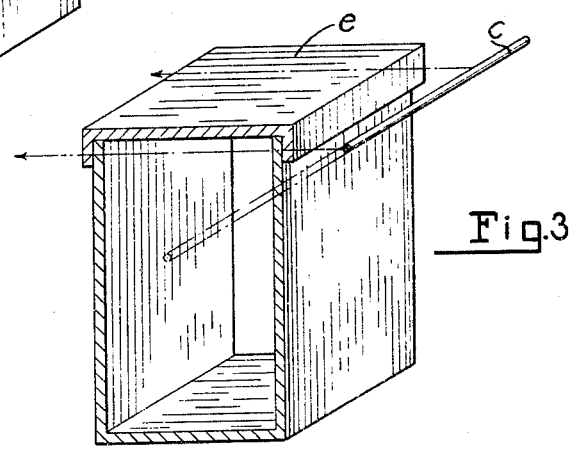

Figure 1 is a diagrammatic illustration of the sealing procedure aplied to a container provided with a cover plate. Figures 2 and 3 are similar illustrations, the cover in Figure 2 having projecting parts extending into the container, while the cover shown in Figure 3 shows parts overlapping the container.

Referring now to the drawings in detail, in Figure 1 $a$ is a sectional elevation of a quadrangular cell or container, consisting of a synthetic organic thermoplastic material, open at the top and provided with cover plate $b$. A tensioned, electrically heated wire $c$ is passed between the contacting surfaces of container $a$ and cover $b$ in the direction of the arrows, whereby the contacting surfaces, i. e. the edges of the vertical walls and the contacting portions of cover $b$, are welded together to the full extent of the cross section of the vertical walls.

Figures 2 and 3 show cells or containers similar to those shown in Figure 1. In Figure 2, a closely fitting cover piece $d$ has projecting portion $d^1$, $d^1$, which extend a short distance into the box at all four walls of the box. In Figure 3, a closely fitting cover piece $e$ has overlapping portions $e^1$, $e^1$ at all four walls of the box.

In order to seal the container or cell shown in Figure 2, a heated electric wire $c$ is passed transversely to the contact surfaces of the vertical walls and projecting parts $d_1$, $d_1$, through the first vertical cell wall, parts $d_1$, $d_1$ and the second vertical wall, from right to the left in the drawing, as indicated by the arrows in Fig. 2. Passing of the heated wire in this manner produces melting and welding and results in a completely tight seam between container and cover.

Sealing of the cell or container shown in Figure 3 by wire $c$ takes place in the same manner as explained above in connection with Fig. 2, by passing the heated wire $c$ transversely to the contact surfaces of the overlapping cover-portions and the vertical walls, in the direction of the arrows in Fig. 3.

The thickness of the heated wire is considerably exaggerated, in the drawing. As mentioned above, in practice a rather thin wire is used.

It will be understood from the above that the invention is not limited to the specific articles, materials, steps, arrangements and other details specifically described above and can be carried out with various modifications. For example, order to obtain increased security, two or more welding seams can be produced, by passing a heated wire according to the invention through contacting surfaces of the thermoplastic container and cover, at two or more points. Furthermore, the process of the invention can be applied to any weldable thermoplastic material, such as products based on polyvinyl chloride, polystyrene, polyethylene resins, polymers of acrylic and methacrylic acid esters, synthetic polyamides and combinations, copolymers or mixtures of these products. In the manufacture of containers containing liquid electrolytes, plastic materials having the necessary resistance and durability are used. These and other modifications can be made without departing from the scope of the invention, as defined in the appended claim.

What is claimed is:

A method of producing a tight seal between a container for electric batteries, adapted to be filled with a liquid electrolyte and a cover fitted to the opening of said container, said container and cover consisting of weldable thermoplastic organic material, said container and cover having registering contacting surface portions, comprising introducing between said contacting portions a thin wire electrically heated to a temperature sufficient for melting said thermoplastic organic material, passing said heated wire in contact with, along and across, said contacting portions in order to melt said portions and then removing said wire from between the contacting portions in order to cause said portions to unite by welding.

References Cited in the file of this patent

UNITED STATES PATENTS

| Number | Name | Date |
|---|---|---|
| 1,369,919 | Eliel | Mar. 1, 1921 |
| 1,687,196 | Daellenbach | Oct. 9, 1928 |
| 1,784,216 | Aldrich et al. | Dec. 9, 1930 |
| 2,516,864 | Gilmore et al. | Aug. 1, 1950 |
| 2,626,971 | Mansoff | Jan. 27, 1953 |
| 2,644,605 | Palmer | July 7, 1953 |
| 2,672,497 | Burns et al. | Mar. 16, 1954 |